3,551,276
HIGH TEMPERATURE INSULATION-BINDER COMPOSITION
Richard F. Shannon, Lancaster, Ohio, assignor to Owens-Corning Fiberglas Corporation, a corporation of Delaware
No Drawing. Filed Apr. 25, 1968, Ser. No. 724,226
Int. Cl. B32b 5/16; C03c 25/02
U.S. Cl. 161—170                     2 Claims

ABSTRACT OF THE DISCLOSURE

Bonded glass fiber insulating materials ranging from resilient, low density wool-like masses, to relatively dense, molded board-like structures of substantially permanent shape. The glass fibers are bonded together at points of fiber-to-fiber contact by heat-setting or with a non-punking organic binder material and the resultant bonded mass is impregnated with an inorganic binder-impregnant which, upon subsequent treatment, hardens to form a ceramic-like, heat-resistant coating for the glass fibers and also serves an auxiliary bonding function.

BACKGROUND OF THE INVENTION

(1) Field of the invention

The production of glass and other vitreous fibers for use as thermal insulating materials, acoustical insulating materials, filter media and textile processing is well-known. Regardless of use, fibers of vitreous fiber articles are bonded to one another at points of contact, e.g., by heat setting or by an associated resinous synthetic material which at least partially coats the fibers. In particular, thermal and acoustical insulating materials of the type described usually comprise a mass of intermeshed vitreous fibers wherein fibers are heat set to one another at points of contact or are at least partially coated with a hardened infusible phenolic material which bonds the individual glass fibers in the mass to one another at points of contact.

Various materials, principally those based upon synthetic resin systems such as, for example, the phenolic resoles, have been used in the past and are presently in use as binder systems for glass fiber insulation. Due, however, to the primarily organic nature of the binders many of the inherent advantages of the glass fibers, such as high temperature stability, are lost with the attendant danger of thermal decomposition or actual punking[1] of the resin.

(2) Description of the prior art

Various methods have heretofore been attempted in order to increase the punk resistance and thermal stability of the binder systems and to cause the properties of the binder system used to approach or exceed those of the glass fibers.

[1] Punking is a term of art used to denote the comparatively rapid, flameless oxidations of the binder with generation of heat. Odors and fumes given off by such thermal decomposition are offensive and are capable of discoloring and staining adjacent materials.

Methods intended to overcome the comparatively low thermal stability of phenolic resole binder systems include the use of inorganic binder-impregnants in association therewith. A problem encountered, however, arises because of the hydrophilic nature of previously known inorganic binder impregnants; when exposed to highly humid conditions or rain, the impregnants absorb moisture and the products become waterlogged and soft. Consequently, an inorganic binder impregnant system which would allow the use of fabricated glass fiber materials at or above the upper limits of the temperature stability of the glass fiber, and which is strongly adherent and water-resistant, has been much sought by the art.

OBJECTS

It is an object of the instant invention to provide an inorganic binder-impregnant composition which has high thermal stability, and which forms a strong, reinforcing bond with glass fibers and associated organic binder, if used.

Another object of this invention is to provide a method for bonding glass fibers together. The method involves impregnating a glass fiber board product with an inorganic binder-impregnant. The inorganic binder-impregnant forms a strongly adherent ceramic sheath around the fibers or around the fibers and associated organic binder of the board product. The sheath acts as a protective coating for the glass fibers and also bonds the glass fibers to one another, at points of contact, at temperatures at which the organic binder, if used, is rendered essentially non-functional.

A further object is the provision of a highly heat-resistant, water-repellant, glass fiber insulating material wherein the individual fibers are coated and bonded to one another by inorganic binding agents, and are also heat set to one another or are coated and bonded to one another by organic binding agents.

SUMMARY OF THE INVENTION

According to the invention, an improved article of manufacture is provided. The article comprises a mass of intermeshed glass fibers bonded to one another at points of contact by heat setting or by a cured, punk-resistant, thermoset organic binder, and a coating of an inorganic binder impregnant on the glass fibers. The impregnant of the article can comprise as little as 60 percent[2], based upon the weight of the glass fibers therein or, on the same basis, as much as 200 percent. The article has an apparent density of at least about 3 pounds per cubic foot and, preferably, has an apparent density ranging from about 10 to about 20 pounds per cubic foot. The basic board product, prior to impregnation, must be dimensionally stable as a consequence of fiber-to-fiber bonds at points of contact formed by heat setting or by from about 5 to about 12 percent of a cured, thermoset, punk-resistant, organic binder, most often of the phenol-formaldehyde resite type. A preferred binder impregnant composition comprises from 74 to 98 percent of aluminum silicate particles consisting essentially of between 10 percent and 90 percent of hydrated aluminum silicate containing between 50 percent and 75 percent of $SiO_2$ and between 15

[2] The terms "percent" and "parts" are used herein and in the appended claims to refer to percent and parts by weight, unless otherwise indicated.

percent and 35 percent of $Al_2O_3$, and, admixed with and interadhering the aluminum silicate particles, between 2 percent and 25 percent of a binder phase consisting essentially of between 1 percent and 20 percent by weight of colloidal silica, bentonite, or a mixture of the two. Preferably, the aluminum silicate particles include, in addition to the hydrated aluminum silicate, from 10 percent to 90 percent of an aluminosilicate of a metal selected from the group consisting of sodium, potassium, calcium, magnesium, barium and combinations of these metals, in which the metal is present in a quantity in excess of 6 percent. According to another preferred embodiment, the coating, in addition, contains an amount of an organo-silicon compound sufficient to impart hydrophobic properties to the finished coating, and is substantially free of any surface-active agent having a residual hydrophilic function.

The term "glass fibers," as used herein, is intended to encompass any fiber made from those materials defined in the ordinary usage of the art as glasses. Such term is further intended to include glass fibers of the type produced by methods known in the art, such as by the attenuation of molten streams of glass by blasts of high pressure steam or air directed angularly downward into the streams as they issued from a bushing of a glass melting tank, as described in Slayter et al. Pat. 2,206,058 or in Simison et al. Pat. 2,189,840. In addition, the superfine glass wool fibers formed by burner blast blown systems may be utilized, as well as fibers produced by so-called rotary processes. Further, glass fibers capable of use in the practice of this invention may be prepared of continuous glass fibers which are cut or chopped to predetermined lengths or of glass fiber or yarns of endless length which are deposited in swirl patterns and the like and in which such continuous fibers may be used alone or in combination with wool or staple type fibers in the production of dimensionally stable boards and various shaped insulating products, including pipe wrap, insulation for various fittings, such as elbows, T's, and the like, ceiling tiles having at least one surface of arcuate or other contour, and other desired shapes. In general, the basic products impregnated usually are boards or segments of pipe insulation. The segments, in general, constitute ¼, ⅓ or ½ of a mass of pipe insulation, so that 4, 3 or 2 are mated to provide a complete insulating wrap for a single segment of pipe.

The basic board product which is impregnated according to the invention to produce a high temperature insulating material must have sufficient dimensional stability that the inorganic binder saturant can be applied thereto to produce the high temperature insulating material without significant deformation of the basic board. The requisite degree of dimensional stability can be provided without the use of any binder by a heat setting step, for example as disclosed in U.S. Pat. 2,016,401 to Thomas, U.S. Pat. 2,344,601 to Collins, and U.S. Pat. 3,328,230 to Levecque et al., as well as in British Pats. 849,833, 851,389, 869,673 and 894,465. In general, the heat setting step can be used to produce a dimensionally stable basic board product from a mass of intermeshed glass fibers produced by any of the methods described above. In its essential details, the method involves merely heating a wool-like mass of intermeshed fibers to cause softening of fibers and, ultimately, adhesion to one another at points of contact, while compressing the mass so that the final board has a desired configuration and apparent density, usually from about 5 to 9½ pounds per cubic foot. In addition, the requisite degree of dimensional stability can be imparted by means of supplemental binding fibers, for example as disclosed in U.S. Pat. 2,772,603 to Waggoner, by means of an inorganic binder such as a silica sol or sodium silicate, or by means of a punk-resistant, cured, organic binder which bonds fibers to one another at points of contact. It is essential that the basic board product be free of any organic binder which either punks appreciably or burns at temperatures below about 450° F.

The presence of an organo-silicon compound in a binder impregnant of the invention also serves to protect the fibers of the basic board or the like against deterioration. This function is particularly important where the fibers of the board are not bonded by an organic binder, the only type of board where silicon compounds are presently incorporated in the binder to serve this function.

The resinous materials which can be used as the main constituent of an organic binder of the present invention are punk-resistant phenolic resin systems and particularly resole systems. As is well known in the art, a resole is formed by the partial condensation of a phenol with an excess of an aldehyde in alkaline solution. The phenolic resoles are known in the art; a detailed discussion can be found in The Chemistry of Phenolic Resins, Robert W. Martin, John Wiley & Sons, Inc., New York, N.Y., 1956. In general, the resoles may consist of phenol-aldehyde condensation products which may be used alone or in admixture with other hardenable resin systems.

The specific heat-hardened phenolic resins, used in the preparation of articles according to the invention, are not, however, part of the invention per se and their identity is therefore of only incidental importance. As stated above, the heat-hardenable phenols used herein are widely available through commercial sources. In most instances, the phenol-aldehyde type of phenolic is prepared by the condensation of phenol (hydroxy benzene) and formaldehyde, although any phenol and any aldehyde which will condense to form a heat hardenable resole-type partial condensation product is suitable. Thus, in lieu of formaldehyde, there may be substituted para-formaldehyde, furfural, acetaldehyde, metaldehyde, tetraldehyde and the like. In place of phenol (i.e. monohydroxy benzene) there may be used equivalent compounds such as resorcinol, xylenols, the cresols and similar compounds. A punk-resistant resole system can be provided by condensing the resole with such amino compounds as melamine, urea, thiourea, dicyandiamide, biurea, granidine and similar materials. Of the various amino compounds set forth, dicyandiamide, urea and biurea are preferred, since a binder composition containing these is not subject to the dilutability problems commonly associated with prior art binder compositions, and melamine and dicyandiamide are preferred because of their greater effectiveness at imparting punk resistance. A punk resistant resole system can also be provided merely by incorporation urea or dicyanidiamide with the resole in formulating a binder composition.

In lieu of the phenol-aldehyde and phenol-amino compound-aldehyde partial condensation products described above, the resin component of the organic binder composition may be prepared by the condensation of amino compounds, such as those set forth above, either singly or in combination, with aldehydes such as formaldehyde, acetealdehyde and the like. As condensing agents, any of the reagents in conventional usage, such as the alkali metal hydroxides and the alkali metal carbonates, may be utilized. In addition inorganic acid catalysts such as boric acid, ammonium sulfate and ammonium chloride and organic acid catalysts such as maleic, fumaric and phthalic acids and their ammonium salts are useful.

In addition to the heat-hardenable resin component, the organic binder may contain other materials which, in toto, make up the formulation of the organic binder system. For example, the aqueous binder slurry may contain conventional processing aids such as emulsifiers, anti-forming agents, lubricants, plasticizers, dyes, flow control agents, fillers, extenders, coupling agents and the like.

Typical organic binders can be prepared as set forth below. Of course, binders similar or equivalent to those set forth below may be substituted for the specific binders described and are intended to fall within the scope of the invention. Similarly, the proportions of the reactants may be changed by one skilled in the art according to the particular formulation and end use desired.

BINDER FOR SHEET INSULATION

| Components | Bonding solids ratio | Additives [1] |
|---|---|---|
| Phenol-formaldehyde resin | 70 | |
| Urea | 30 | |
| $(NH^4)_2SO^4$ | | 0.5 |
| Silicone oil | | 0.1 |
| Emulsified petroleum oil | | 5.0 |

[1] Percent by weight based on bonding solids.

The binder can be prepared in a mixing tank provided with a propeller-type agitator and at a temperature of about 120° F. Water is usually added so that the final formulation has a solids content of about 20 percent.

A dimensionally stable basic board product can be produced by spraying the binder composition described above into a forming hood through which glass fibers are being projected onto a foraminous conveyor. The fibers are collected in the form of a randomly intermeshed wool-like mass associated with the binder composition. The relative proportion of associated binder can be such that the binder, after cure, constitutes slightly in excess of 5 percent nominal of the total wool-like mass. Cure can be accomplished in an oven maintained at a temperature of about 450° F. in which the glass fibers and associated binder are exposed for about 5 minutes by passage therethrough and within which the mass is compressed sufficiently that boards having apparent densities of about 5.5 lbs. per cubic foot are produced.

A typical binder for pipe insulation has the following composition.

BINDER FOR PIPE INSULATION

| Components | Bonding solids ratio | Additives [1] |
|---|---|---|
| Phenol-melamine-formaldehyde | 82.6 | |
| Melamine crystals | 2.4 | |
| Vinsol (R) | 15.0 | |
| $(NH^4)_2SO^4$ | | .5 |
| Silicone oil | | .1 |
| Emulsified petroleum oil | | 7.5 |

[1] Percent by weight based on bonding solids.

The binder composition set forth immediately above is utilized in essentially the same manner as the binder for sheet insulation except that for typical pipe insulation the binder constitutes about 7 percent nominal of the wool-like mass, and the mass is shaped to conform with the configuration of the pipe and is compressed to such an extent that the density ranges from 6–10 lbs. per cubic foot.

Dimensionally stable basic board products can also be produced by the heat setting and binder fiber techniques to which reference is made above, and by the procedures described in the indicated patents. In the case of sheet insulation, the glass fibers should be present in such proportion, and compacted to such a degree, that the basic board product, disregarding the bonding fibers, if used, has an apparent density from about 5 to about 6 lbs. per cubic foot, while, in the case of pipe insulation, the apparent density of the basic board product, again disregarding bonding fibers, if used, should be from about 5 to about 9½ lbs. per cubic foot.

The binder-impregnant according to the invention contain both inorganic particulate matter, and a binder phase comprising colloidal silica, bentonite [3] or both. The binder phase is capable of interadhering the inorganic particles both at ambient conditions and during exposure to temperatures in excess of 1000° F. Preferably, the binder-impregnant also includes an organo-silicon water repellent compound. Ideally, the organo-silicon compound is first emulsified with a fugitive emulsifier and then incorporated into the binder-impregnant.

Specifically, the binder phase comprises from about 2 percent to about 25 percent by weight of the total solids present in the binder-impregnant and the inorganic particulate matter comprises from about 98 percent to about 74 percent. Preferably, the organo-silicon water repellent compound and optional fugitive emulsifier constitute from about 1 percent to about 24 percent of the binder-impregnant. The colloidal silica and bentonite are present in the binder phase in ratios ranging from 1:19 to 19:1.

The binder-impregnant preferably contains between 1 percent and 20 percent of colloidal silica and between 1 percent and 15 percent of bentonite. It should be noted that references are to quantities of colloidal silica solids, although these compositions are normally employed as dispersions in a liquid carrier medium such as water.

The inorganic particles which are interbonded by the foregoing binder phase include, as high melting materials, certain hydrous aluminum silicates which are subsequently described. The particles preferably include, in addition, materials melting below 2000° F. The lower melting materials are the alumino-silicates of the Group I and II metals, sodium, potassium, calcium, magnesium, and barium, and aluminosilicates containing two or more of these metals. The combination of low melting and high melting inorganic particles is preferred because the former particles enable the formation of a molten or ceramic phase, which is highly desirable in the attainment of structural integrity at elevated temperatures.

It is believed that the lower melting materials provide a new or auxiliary adhesive phase upon exposure to temperatures in the range of 1000–2500° F., and that this auxiliary phase serves to interadhere the higher melting particles and to maintain structural integrity. While structural integrity resulting from a "liquid" or molten phase may at first appear contradictory, the nature of this "liquid" must be considered. Specifically, the Group 1 and/or Group II metals function as fluxes which facilitate the melting of a portion of the ingredients of the impregnant and form an extremely viscous adhesive. For example, molten glass compositions commonly possess viscosities in the range of $10^4$ to $10^7$ poises and consequently are not highly fluid liquids in the ordinary sense of the word.

The previously described binder phase comprising from 2 to 25 percent of the binder-impregnant, is employed to interbond from 74 percent to 98 percent of the binder-impregnant of the inorganic particulate materials. In the preferred admixture the ratio of higher melting hydrated aluminum silicate particles to the lower melting sodium, potassium, calcium, magnesium, and barium aluminosilicates ranges from 1:9 to 9:1. Consequently, the impregnant composition preferably contains from 7.4 percent to 88.2 percent by weight of the lower melting material and

---

[3] Bentonite, usually predominantly sodium montmorillonite, beidellite or a combination of the two, serves both as a binder for the impregnant and, by increasing the viscosity of a slurry thereof, as a process aid facilitating the required degree of penetration of the slurry without filtration of solids therefrom. Calcium montmorillonite is somewhat less effective as a binder and does not function as a process aid unless subjected to high shear or converted to the sodium cycle. Alginates, methylcellulose and other thixotropic materials can be used in place of bentonite where only the process aid function is required.

from 7.4 percent to 88.2 percent of the higher melting material.

Thus, the preferred binder-impregnants generally comprise:

|  | Percent |
| --- | --- |
| Colloidal silica (solids) | 1–20 |
| Bentonite | 1–15 |
| Hydrated aluminum silicate | 7.4–88.2 |
| Na, K, Ca, Mg and Ba aluminosilicates | 7.4–88.2 |
| Organo-silicon compound | 1–24 |

Most desirably, the binder-impregnants contain:

|  | Percent |
| --- | --- |
| Colloidal silica (solids) | 2–6 |
| Bentonite | 1–5 |
| Ball clay | 15–25 |
| Feldspar | 65–80 |
| Alkylsiloxane copolymer | 3.0 |
| 3,5-dimethyl-1-hexyn-3-ol | 0.3 |

Colloidal silica and silica sols are commercially available compositions and materials of this nature, as well as methods for their preparation, are disclosed by U.S. Pats. 2,244,325; 3,083,167; 3,041,140 and 3,128,251.

The hydrated aluminum silicates employed by the invention are ball clays consisting primarily of kaolinite, illite, halloysite, and montmorillonite, with minor quantities of ferric oxide, finely divided silica and titanium dioxide, and trace amounts of lime, magnesia, soda, and potash. More precisely, they contain from 50 to 75 percent of $SiO_2$, from 15 to 35 percent of $Al_2O_3$ and from 0.5 to 10 percent of $Fe_2O_3$ with conventional silica, alumina and iron contents of approximately 57:27:1. Ball clays are distinguished from the more common clays such as kaolin clays, by their lower alumina contents, e.g. 15 to 35 percent as opposed to 37 to 50 percent for kaolin clays. In addition, from 50 to 90 percent of the particles which make up the ball clays employed by the invention have a diameter of 10 microns or less. Furthermore, and as contrasted with the subsequently discussed alkali metal aluminosilicates, the ball clays have a total alkali and alkaline earth metal content of from 0.5 to 4 percent. It should be noted that in reference made to the quantity of ingredients present in clays or minerals, the total weight of the composition from which the percentages are derived may contain minor quantities of organic materials. Typical of these hydrated aluminum silicates are the Maryland and Tennessee ball clays generally, and such specific materials as Saxon clay, Yankee ball clay, Rex Clay, XB ball clay, pyrophyllite, and the like.

The lower melting material is preferably feldspar but, generally, Group I and II metal aluminosilicates of sodium, potassium, calcium magnesium or barium aluminosilicates, combinations thereof, or aluminosilicates which contain two or more of the specified metal ions, i.e. Na, K, Ca, Ba, or Mg can be used. In addition, these metals are present in a quantity of from 6 to 20 percent and preferably from 8 to 15 percent. Examples of such aluminosilicates include the feldspars such as orthoclase, albite, hydophane, microcline, anorthite, anorchoclase, etc.: and such compounds as nepheline, cancrinite, thomsonite, eucryptite, grossularite, alumonitite, phillipsite, etc. In addition, the majority of the particles making up these compositions also have diameters of no more than 20 microns.

The organo-silicon compounds are preferably added to the impregnant composition in order to provide water repellency in the finished product.

Various types of organo-silicon compounds can be used, such as the silanes, polysiloxanes, siloxane copolymers, and metal siliconates. Whatever type of organosilicon compound is used, it must be one which will increase the hydrophobicity of the finished product. Thus it must retain its hydrophobic properties during drying of the impregnants produced at temperatures up to 450° F. or more.

Some organo-silicon compounds are better than others in maintaining hydrophobicity; therefore, the amount to be used will vary depending upon the specific identity of the compound. In any event, however, the organo-silicon compound should be used in a quantity sufficient to achieve the desired properties in the final product.

Examples of organo-silicon compounds which have been found to be suitable for use according to the invention include copolymers of methyl- and higher-alkyl-siloxanes in which the ratio of organo groups attached to silicon per silicon atom lies in the range of from 1.1 to 1.3, and copolymers of alkyl-siloxanes in which the ratio of organo groups attached to silicon per silicon atom is about 1.0. Still other operable compounds include siloxane copolymers of 4.5 to 17 mol percent diphenylsiloxane, 22 to 55 mol percent monophenylsiloxane, and 40 to 65 mol percent mono-methylsiloxane. Such copolymers and methods for the preparation thereof are described in U.S. Pat. 2,718,483, assigned to the Dow Corning Corporation, Midland, Mich. Silicone fluids (e.g., the dimethyl polysiloxanes of varying average molecular weight) are also operable, as are silanes per se, although hydrolysis thereof and condensation to siloxanes probably occurs in the aqueous binder-impregnant system. Optimum results in the sense of increment of hydrophobicity imparted per unit of organo-silicon compound incorporated in the binder-impregnant have been achieved using siloxane copolymers in which the ratio of organo groups attached to silicon per silicon atom is from about 1 to about 1.3. Other operable compounds include silanes such as gamma-aminopropyltriethoxy silane, methylalkoxy silanes, and phenylalkoxy silanes.

It is preferable that water-insoluble organo-silicon compounds, when used, be emulsified before incorporation into the binder-impregnant in order that they be compatible with the water base thereof. The emulsification must be accomplished without destroying the hydrophobic properties of the finished product. It has been found that the use of 3,5-dimethyl-1-hexyn-3-ol as a surfactant in emulsifying the organo-silicon compounds is particularly suitable.

An especially preferred organo-silicon compound is manufactured by the Dow Corning Corporation, Midland, Mich. and is sold under the trade name DC 770. Other suitable organo-silicon compounds include those sold under the trade names GE Dry Film 144, GE 202–1087, and Union Carbide Y-5262 and Y-5263.

Organo-silicon compounds in the form of metal salts are also effective, the alkali metals being most preferred. The alkali salts are water-soluble polymeric materials in which the metal atoms are linked to the silicon through oxygen atoms (Si—O—M). For the purpose of this invention there should be from 1 to 2, preferably from 1 to 1.2, metal atoms per silicon atom. In the salts there are on the average from 1 to 1.5 hydrocarbon radicals per silicon atom and at least a major portion of the polymer linkages are Si—O—Si linkages with any remaining polymer linkages being of the type Si—Si and/or Si—R'—Si linkages where R' is a divalent hydrocarbon radical. The salts react with the carbon dioxide and moisture of the atmosphere to form silicone resins "in situ." Operable salts and their method of manufacture are described in U.S. Pat. 3,011,908, and are commercially available under the trade names GE SC–3000, GE SC–50 and GE 81565.

Because the hydrophilic portion of an emulsifying agent is incompatible with water repellency in the finished product, it is necessary that the emulsifying agent be fugitive, e.g., when the product is cured or heated the emulsifying agent volatilizes or reacts so that it no longer has a hydrophilic function, and thus does not interfere with the action of the organo-silicon compound. Silicon block copolymers produced, for example, as described in U.S. Pat. 3,081,269, and dialkyl siloxane-glycol copolymers described in U.S. Pat. 2,993,871 are fugitive surfactants because during heating to a temperature in the vicinity of 450° F., they undergo a chemical change which eliminates the hydrophilic function. Such polymers can be used as fugitive surfactants in producing stable emulsions of silicon compounds for use according to the invention in binder saturants. Such copolymers can be used alone, or in conjunction with other surfactants which are fugitive by virtue of volatility, for example. Ammonium oleate and 3,5-dimethyl-1-hexyn-3-ol are examples of surfactants which are fugitive because of volatility during heating to a temperature in the vicinity of 450° F. It is frequently efficacious to add ammonium hydroxide in producing an emusion of a silicon compound, and for the purpose of improving emulsion stability. Sufficient emulsifying agent must be used to emulsify the organo-silicon compound completely, and an oil in water emulsion is required, rather than a water in oil emulsion. The quantity of emulsifying agent required will vary depending on the compound or compounds.

A preferred organo-silicon compound [4] is typically emusified in the following manner:

Ten parts of the organo-silicon compound are added and stirred with 1 part of 3,5-dimethyl-1-hexyn-3-ol in a mixing tank; then ammonium hydroxide is added until the mixture is at an alkaline pH. Thereafter 2 parts of oleic acid are added, forming ammonium oleate (also a fugitive emulsifier). Following this 10 to 20 parts of water are added and the entire mixture is stirred until a creamy mix is obtained. This mix is then tested by placing a drop on a water surface; if the drop seems to spread over the surface and disappear after a few seconds, the emulsion is then diluted with the desired amount of water and poured into a high shear mixer and further treated. If the drop does not spread, more ammonium hydroxide and additional water are added, with stirring, until an oil in water emulsion is formed, as indicated by spreading and disappearance of a drop on a water surface, as described.

The other water-insoluble organo-silicon compounds disclosed herein can be emulsified in the same general manner. Some of the metal siliconates are water-soluble and do not require emulsification.

The examples in the following table provide a number of formulations suitable for use in the present invention, in which the quantities of ingredients are expressed as percentages by weight:

The feldspar left a residue of 0.3 percent on a 200 mesh screen (U.S. Sieve Series), and 3.2 percent on a 325 mesh screen (U.S. Sieve Series) (68.2 percent of the particles had a diameter of 20 microns or less). Feldspars II and III were similar in respect to ingredients and total alkali and alkaline earth metal content, i.e. approximately 12–16 percent by weight, but feldspar II possessed a higher $K_2O$ and lower $Na_2O$ content, while feldspar III contained a higher $CaO$ and $MgO$ content.

Ball clays I and II in the above table contained the following quantities of ingredients and possessed the specified properties:

|  | Ball Clay I | Ball Clay II |
|---|---|---|
| $SiO_2$ | 60.19 | 58.66 |
| $Al_2O_3$ | 26.47 | 25.40 |
| $Fe_2O_3$ | 0.89 | 2.29 |
| $TiO_2$ | 1.72 | 1.21 |
| $CaO$ | 0.31 | 0.13 |
| $MgO$ | 0.23 | 0.75 |
| $Na_2O$ | 0.33 | 0.32 |
| $K_2O$ | 0.44 | 2.55 |
| Organic | 9.42 | 8.69 |
| pH | 4.4 | 3.9 |
| Oil absoprtion, percent | 34.5 |  |
| Residue on 200 mesh, percent | 0.8 |  |
| Particles having diameter of 1 micron or less, percent | 81.0 | 93.0 |
| Shrinkage at 2,000° F., percent | 2.4 | 3.6 |

Ball clay III was similar to ball clay I with the exception that a portion of the aluminum silicate was present as pyrophyllite.

The colloidal silicas of the foregoing examples were employed as aqueous dispersions containing from 10 to 60 percent of colloidol silica and preferably 40 percent. However, the quantities recited refer to the amount of silica solids employed.

The binder-impregnants of the above examples were prepared by admixing the ingredients with water to form a slurry. The polysiloxane was added in the form of an emulsion produced as described above. While a slurry containing 10 to 50 percent and preferably 15–25 percent of solids is preferred in most cases, the ratio must be gauged to yield a binder-impregnant of the viscosity desired for the specific applicator system and substrate employed. Sodium hexametaphosphate may also be added to reduce viscosity and such addition is optional.

The various binder saturants identified above were used at substantially the minimum solids contents at which the aqueous systems had body, in order to minimize the viscosity thereof, to saturate sheet insulation and pipe-wrap insulation produced as described above. A vacuum was applied across the insulation, and an excess of the binder-impregnant slurry was poured onto the insulation, so that the slurry was drawn therethrough, and excess was removed. The impregnated insulation was then heated for 4 to 10 hours at a temperature of about 450° F. in an

TABLE I

| Ingredients | Examples |  |  |  |  |  |  |  |  |
|---|---|---|---|---|---|---|---|---|---|
|  | 1 | 2 | 3 | 4 | 5 | 6 | 7 | 8 | 9 |
| Feldspar I | 45.4 | 70.9 | 12.6 |  |  | 35.4 |  | 73.5 |  |
| Feldspar II |  |  |  |  |  |  | 67.6 |  |  |
| *Feldspar III [1] |  |  |  |  |  |  |  |  | 67.6 |
| Nepheline |  |  |  | 71.0 |  |  |  |  |  |
| Ball clay I | 45.4 | 17.7 | 76.3 |  | 44.5 | 17.9 | 16.4 |  | 16.4 |
| Ball clay II [2] |  |  |  | 17.9 |  |  |  | 18.3 |  |
| Ball clay III |  |  |  |  | 44.5 | 35.4 |  |  |  |
| Colloidal silica solids | 2.6 | 4.9 | 2.9 | 2.9 | 2.9 | 2.9 | 9.7 | 1.6 | 4.8 |
| Bentonite | 3.2 | 3.2 | 4.8 | 4.8 | 4.8 | 4.8 | 2.9 | 3.2 | 7.7 |
| Silicone Resin A | 3.0 | 3.0 | 3.0 | 3.0 | 3.0 | 3.0 | 3.0 | 3.0 | 3.0 |
| 3,5-dimethyl-1-hexyn-3-ol | 0.3 | 0.3 | 0.3 | 0.3 | 0.3 | 0.3 | 0.3 | 0.3 | 0.3 |

[1] Lower melting materials.
[2] Higher melting materials.

Feldspar I in the above table comprised the following quantities of ingredients expressed in percentages by weight:

| $SiO_2$ | 67.53 | $CaO$ | 1.36 |
|---|---|---|---|
| $Al_2O_3$ | 19.40 | $MgO$ | ([1]) |
| $Fe_2O_3$ | .06 | $Na_2O$ | 6.83 |
| $TiO_2$ | ([1]) | $K_2O$ | 4.58 |
|  |  | ([2]) | .22 |

[1] Trace.
[2] Organic.

---

[4] The compound, subsequently called "Silicone Resin A," is produced substantially as described in Example 1 of U.S. Pat. 2,718,483.

air circulating oven to dry the binder impregnant. In all cases, the products were found to be satisfactory for continuous operation at temperatures up to 1200° F. The pipe-wrap insulation, after impregnation and drying, had an apparent density of from about 11 to 15 pounds per cubic foot: basic board 6 to 9 pounds per cubic foot, 7 to 12 percent binder by weight. The sheet insulation, after impregnation and drying, had an apparent density of about 10 to 13 pounds per cubic foot: basic board 5 to 7 pounds per cubic foot, 5 to 12 percent binder by weight.

Various other ingredients such as reinforcements, opacifiers, fillers, wetting agents, anti-foaming agents, dispersing agents, and the like, may be added to the inventive binder-impregnants. Typical of such additives are asbestos, asbestine, wollastonite, titania, zircon, zirconia, alumina, carbon black, crystalline silica, calcium carbonate, barium sulfate, magnesium carbonate, ferric sulfate, sodiumhexametaphosphate and the like.

It is apparent that the combinations of higher and lower melting materials may be simulated by adding fluxing agents to hydrated aluminum silicates having a high melting point, e.g. 2000–3500° F. For example, a fluxing agent such as sodium oxide may be added to a ball clay in a quantity adequate to exert a fluxing effect upon only a portion of the clay, e.g. 8 percent by weight. Such an expedient also results in a molten or ceramic adhesive phase but is more expensive and difficult to prepare, since minerals which naturally contain a fluxing agent content, e.g. feldspar, are readily available.

The drying times (elimination of water) and temperatures for the inorganic binder-impregnant may vary within rather wide limits, such as from 4 to 12 hours and from 425° F. to about 550° F., but neither time nor temperature is critical. Higher or lower temperatures can be used, and drying can be discontinued as soon as the binder-impregnant is sensibly dry, but longer drying is not harmful.

Substantially equivalent results can be achieved if any of the examples set forth above is repeated, except that an equivalent amount of an emulsion, prepared as described above, from a silicone resin commercially available under the designation DC–770, a silicone resin commercially available under the designation Dry Film 144, or a silicone resin commercially available under the designation UCR–23 is substituted for the Silicone Resin A emulsion. Substantially equivalent results can also be achieved if the Silicone Resin A emulsion is replaced by about four times as much DC–200 fluid, preferably added in the form of an emulsion prepared as described above.

Various binder impregnants for improving the high temperature properties of bonded glass fiber products have previously been suggested. By way of example, bentonite in the hydrogen form in combination with boric acid can be used as a binder saturant, and kaolin clay in addition my be used as a reactive filler, or pyrophyllite can be additionally used as an inert filler. In such a binder saturant the boric acid is preferably used in an amount at least sufficient to convert the bentonite to the hydrogen form and to provide an appreciable excess of free boric acid, e.g. at least about 1 percent. Such a binder saturant, which can be used in the manner previously described to improve the elevated temperature properties of glass fiber products, can be produced in a 600 gallon mixing tank equipped with a Cowles agitator according to the following procedure:

The mixer is first charged with 400 gallons of water, followed, with slow agitation, by 2.5 pounds of sodium hexametaphosphate, 50 pounds of boric acid and 220 cc. of an 85 percent aqueous solution of phosphoric acid. After these ingredients are fully mixed and dissolved, a 250 pound portion of bentonite is added to the solution. The sides of the tank are then washed and the slurry is agitated at high speed for at least 15 minutes. When the slurry appears to be well mixed, additions of 750 pounds of kaolin clay and 250 pounds of pyrophyllite are made and the slurry is agitated at high speed for 20 minutes, at which time agitation is stopped and a sufficient quantity of water is added to produce 575 gallons of saturant-binder slurry having a solids content of about 22.7 percent. After the additional water is added, the agitator is again started at slow speed and a 5 quart quantity of Stoddard solvent containing 4 ounces of a methylpolysiloxane anti-foam agent and 14 quarts of a 75 percent aqueous solution of sulfonated dicarboxylic acid ester wetting agent are added. Agitation is then continued for 15 minutes and the slurry is ready for use.

Other inorganic binder saturants and their use to improve the elevated temperature properties of glass fiber products are disclosed in U.S. Pat. 3,348,994, and in U.S. Pat. 3,002,857. All of these previously known inorganic binder saturants are beneficial in the sense that they improve the high temperature properties of bonded glass fiber products. However, all of these previously known inorganic binder saturants are also hydrophilic in nature, and are capable of absorbing or adsorbing large quantities of water. This hydrophilic nature has militated against the use of such glass fiber products in many applications where their high temperature properties would be highly desirable, for example, in installations where the products are subjected to highly humid conditions or may even become wet, before, during or after installation. Siloxane copolymer emulsions produced as described above using only fugitive surfactants can advantageously be used to make such inorganic saturant binders hydrophobic in the final products. A relatively high proportion of the siloxane copolymer is usually required, for example in the range of 1 to 5 percent, although the optimum percent depends upon the precise nature of the binder-saturant, and the sizes of the various particles therein. Ordinarily, the amount used should be just sufficient to impart the degree of hydrophobicity desired in the final product to avoid waste of the comparatively expensive ingredient, although larger amounts up to about 24 percent of total binder solids are not harmful. In addition, the use of surface-active agents of a non-fugitive nature, e.g., the sulfonated dicarboxylic acid ester of the foregoing boric acid-acid form bentonite binder-impregnant, should be avoided.

Organo-silicon compounds, as disclosed herein, can also be incorporated, without emulsification, in the various binder saturants disclosed herein. In this case, when the organo-silicon compound is water-insoluble, it is usually preferred, in addition, to employ one of the fugitive surfactants or fugitive surfactant systems to facilitate suspension of the organo-silicon compound. Agitation of the aqueous binder-saturant system is also desirable, and for the same reason. Even so, some segregation of the organic material is likely, but satisfactory water repellency can be imparted.

Obviously, many modifications and variations of the present invention are possible in the light of the above disclosure. For example, the impregnant can be used with basic boards made with other binder systems, as discussed above, or with binder systems similar to that specifically identified above where dicyandiamide or other aminoplasts are used in an unreacted form in place of the urea. It is, therefore, to be understood that, within the scope of the appended claims, the invention may be practiced otherwise than as specifically described.

What I claim is:

1. An article of manufacture comprising a mass of intermeshed glass fibers bonded to one another at points of contact by fusion, by inorganic bonding fibers or by a cured, punk-resistant, thermoset organic binder and from 60 percent to 200 percent, based upon the weight of the glass, of a coating on the glass fibers of a composition comprising from 74 to 98 percent by weight of aluminum silicate particles consisting essentially of between 10 percent and 90 percent by weight of hydrated aluminum silicate containing between 50 percent and 75 percent by weight of $SiO_2$ and between 15 percent and 35 percent by weight of $Al_2O_3$, and admixed with and interadhering said aluminum silicate particles between 2 percent and 25 percent by weight of a binder phase consisting essentially of between 1 percent and 20 percent by weight of colloidal silica, bentonite, or a mixture of the two, and an amount of an organo-silicon compound selected from the group consisting of silanes, polysiloxanes, siloxane copolymers, and metal siliconates sufficient to impart hydrophobic properties to the finished coating, said coating being substantially free of any surface active agent having a residual hydrophilic function, and said article having an apparent density of at least 3 pounds per cubic foot.

2. An article of manufacture as claimed in claim 1 wherein the organo-silicon compound is a siloxane copolymer in which, on the average, the ratio of organo groups attached to silicon per silicon atom is from about 1:1 to about 1.3:1.

References Cited

UNITED STATES PATENTS

| | | | |
|---|---|---|---|
| 3,380,877 | 4/1968 | Smucker et al. | 161—170 |
| 3,009,829 | 11/1961 | Goveia | 117—126I |
| 3,002,857 | 10/1961 | Stalego | 117—126GI |
| 2,886,466 | 5/1959 | Iler et al. | 117—126I |
| 2,843,461 | 7/1958 | Labino | 117—126GI |
| 2,673,824 | 3/1954 | Biefeld et al. | 161—170X |
| 2,610,957 | 9/1952 | Steinman et al. | 260—38 |
| 2,597,872 | 5/1952 | Iler | 161—In Org. |
| 2,493,604 | 1/1950 | Walters | 117—126GI |

ROBERT F. BURNETT, Primary Examiner

M. A. LITMAN, Assistant Examiner

U.S. Cl. X.R.

117—126; 161—193